(12) United States Patent
Souisse et al.

(10) Patent No.: US 7,917,129 B2
(45) Date of Patent: *Mar. 29, 2011

(54) METHOD AND APPARATUS FOR DISTRIBUTED DATA TRANSFER OVER MULTIPLE INDEPENDENT WIRELESS NETWORKS

(75) Inventors: Slim Salah Souisse, San Diego, CA (US); Michael Scott Andrews, Escondido, CA (US)

(73) Assignee: Novatel Wireless, Inc., San Diego, CA (US)

( * ) Notice: Subject to any disclaimer, the term of this patent is extended or adjusted under 35 U.S.C. 154(b) by 235 days.

This patent is subject to a terminal disclaimer.

(21) Appl. No.: 11/754,934

(22) Filed: May 29, 2007

(65) Prior Publication Data
US 2008/0037541 A1    Feb. 14, 2008

Related U.S. Application Data

(63) Continuation of application No. 09/938,357, filed on Aug. 23, 2001, now Pat. No. 7,224,964.

(60) Provisional application No. 60/227,427, filed on Aug. 23, 2000.

(51) Int. Cl.
*H04M 3/42*    (2006.01)

(52) U.S. Cl. .................. 455/414.2; 455/414.1; 455/557; 455/556.2

(58) Field of Classification Search .............. 455/414.2, 455/414.4, 557, 556.2, 556.1
See application file for complete search history.

(56) References Cited

U.S. PATENT DOCUMENTS

| | | | |
|---|---|---|---|
| 5,574,979 A | 11/1996 | West | |
| 5,805,581 A | 9/1998 | Uchida et al. | |
| 6,009,087 A | 12/1999 | Uchida et al. | |
| 6,138,158 A | 10/2000 | Boyle et al. | |
| 6,185,208 B1 | 2/2001 | Liao | |
| 6,343,318 B1 | 1/2002 | Hawkins et al. | |
| 6,389,010 B1 | 5/2002 | Kubler et al. | |
| 6,397,259 B1 | 5/2002 | Lincke et al. | |
| 6,590,909 B1 * | 7/2003 | Stacey et al. | 370/537 |
| 7,224,964 B2 * | 5/2007 | Souissi et al. | 455/414.4 |

* cited by examiner

*Primary Examiner* — Creighton Smith
(74) *Attorney, Agent, or Firm* — AlbertDhand LLP

(57) ABSTRACT

The present invention provides for methods and apparatus for fragmenting a single message and sending the message fragments over multiple independent networks to a single receiving unit. The receiving unit then reassembles the message fragments to generate the original message. The preferred apparatus embodiment is a wireless radio frequency modem that can both receive and transmit fragmented messages over multiple independent networks.

20 Claims, 9 Drawing Sheets

METHOD AND APPARATUS FOR DISTRIBUTED DATA TRANSFER OVER MULTIPLE INDEPENDENT WIRELESS NETWORKS

CROSS-REFERENCE TO RELATED PATENT APPLICATIONS

This application is a Continuation of U.S. application Ser. No. 09/938,357, filed Aug. 23, 2001, incorporated herein by reference in its entirety, which claims priority from Provisional Application U.S. Application 60/227,427, filed Aug. 23, 2000, incorporated herein by reference in its entirety.

This application claims the benefit of U.S. Provisional Application No. 60/227,427 filed Aug. 23, 2000.

FIELD OF THE INVENTION

The present invention is directed to methods and apparatus for wireless communications and more specifically to methods and apparatus for transferring a single fragmented message over multiple networks to a single receiving device.

BACKGROUND OF THE INVENTION

New wireless Internet applications continue to drive the need for increased electromagnetic spectrum utilization in the form of an increase in bandwidth for transmitting data. Service providers and regulators are simultaneously seeking an equivalent increase in spectrum utilization. To address the above ever-present demands, a variety of different wireless networks, i.e. Advanced Mobile Phone System ("AMPS"), Global System Mobile ("GSM"), and Personal Communications Service ("PCS") were developed to transmit data using different frequencies of the radio spectrum.

In addition, several technologies have been developed for more efficient use of the radio spectrum. For instance, Frequency Division Multiple Access ("FDMA") is a data transmission technique that allows many cellular telephone users to communicate with one base station by assigning each user a different frequency channel. Code Division Multiple Access ("CDMA") is a technique that enables cellular telephone users to share a given frequency channel by breaking each transmitted signal into many packets of data, each of which is tagged with the cell phone user's code, wherein the packets are spread over a band of frequencies and then reassembled at the receiving end. Cellular Digital Packet Data ("CDPD") is another data packet technique similar to CDMA. Orthogonal Frequency Division Multiple access ("OFDM") is a technique wherein a data message is split into fragments, and using a single transmitting source, the fragments are simultaneously transmitted over a cluster of (adjacent) radio frequency ("RF") channels with all channels using the same modulation/coding type and controlled by the same protocol rules. Finally, Time Division Multiple Access ("TDMA") is a technique for channel sharing that assigns each cell phone user a repeating time slot in a frequency channel.

Moreover, the current wireless communications infrastructure as described allows most United States and worldwide cellular regions to provide for multiple independent standards. Some infrastructure base station equipment and client side terminal devices, such as cellular telephones, also have the capability to operate according to multiple standards. Nonetheless, inefficient utilization of the above-described communications infrastructure occurs for a number of reasons.

First, many client side wireless modem devices operate according to only one standard. This is also true for wireline modems. In addition, most wireline base station equipment is incapable of operating according to multiple standards because of the more constrictive electromagnetic nature of copper wire and coaxial cable used with this equipment. Second, although multiple wireless standards may occupy the same region and not interfere with each other, these standards typically occupy principally the same frequencies in the electromagnetic spectrum, or very nearly so. This limits a perspective user to one air standard or another at any given time. Examples include AMPS and CDMA in the same geographical area or GSM and CDMA in the same geographical area. In addition, inefficient utilization may occur due to various interference issues among the above cellular techniques, which may also limit a prospective cellular telephone user to one air standard or another, i.e. limiting use to AMPS, which uses CDPD technique or IS-95, which uses the CDMA technique when both are available in the same region.

Finally, the current hardware used to facilitate wireless communications limits the utilization of the available bandwidth. One such example is presently available multimode radio technology, i.e. iDEN/GSM and ANALOG/CDMA radios and tri-mode cellular telephones. iDEN/GSM and ANALOG/CDMA radios increase the effective footprint of a coverage area by enabling roaming across multiple technologies, and tri-mode phones can operate using three different standards. However, each described unit is only capable of operating according to one standard at a time.

The limitation to one air standard or the other at any given time (in a multiple standard geographic region) prevents both carriers and users from maximizing the utilization of the available infrastructure for wireless data traffic. What is needed are techniques and apparatus that can be used to increase utilization of the existing infrastructure and simultaneously provide users with the greatest possible bandwidth for data traffic given the existing infrastructure.

SUMMARY OF THE INVENTION

The present invention is directed at addressing the above-mentioned shortcomings, disadvantages, and problems of the prior art. The present invention provides for a wireless radio frequency ("RF") modem constructed to cooperatively operate with an external message split controller, said external message split controller operative to split a message into a plurality of message fragments according to one or more predetermined criteria, and to include with each said message fragment an identifier of where said message fragment was located within said message, to enable each said message fragment to be transmitted to said RF modem as a separate electromagnetic signal via a separate selected transmitting source over a corresponding selected radio frequency, said RF modem comprising: an RF front end operative, for each said separate electromagnetic signal, to receive the signal, to detect the radio frequency over which the signal was transmitted and to downconvert the signal to generate a corresponding baseband signal; a baseband processing unit coupled to said RF front end and operative to detect and decode each said baseband signal generated by said RF front end to generate each said corresponding transmitted message fragment; a central processing unit ("CPU") coupled to said RF front end and to said baseband processing unit, said CPU operative to detect said identifiers; and a message fragment combining unit coupled to said CPU for combining said message fragments as a function of said identifier to generate the original message.

In a preferred embodiment, the modem also comprises a modem message split controller for performing message fragmentation to enable an outgoing message to be split into multiple message fragments for transmission over multiple independent networks. Moreover, the external message split controller may be included in a proxy server connected to the Internet, a network controller for a data communications network or a transmitter controller for a data communications network.

The present invention also provides for a method for transmitting a message to a single receiving unit over a plurality of independent transmitting sources, said method comprising the steps of: (a) selecting at least two available transmitting sources for transmitting a message to an intended receiving unit and selecting a corresponding radio frequency for each said selected transmitting source; (b) splitting said message into a plurality of message fragments according to at least one predetermined criteria and including with each said message fragment an identifier of where said fragment was located within said message; (c) causing each said message fragment to be transmitted to said receiving unit as a separate electromagnetic signal via a separate said selected transmitting source over the corresponding selected radio frequency; (d) receiving, in said receiving unit, each said separate electromagnetic signal and extracting the corresponding message fragment; and (e) combining, in said receiving unit, said message fragments as a function of said identifiers to generate the original message. The message fragmentation step may be performed according to one or more Quality of Service criteria, including cost, battery life, latency, network congestion, and the message fragments may be sent over either homogeneous or heterogeneous networks.

An object of the present invention is to increase the effective throughput of a wireless device, to increase utilization of the existing wireless communications infrastructure and to provide users with the greatest possible bandwidth for transmitting data given the existing infrastructure, especially in areas where multiple wireless/wireline networks coexist, by simultaneously using those multiple networks to send a fragmented message to a single receiver unit.

A key advantage of the present invention is that it provides for the aggregation of compatible cellular and wireless Local Area Network ("LAN") standards in a given cellular region, thus enabling multiple, independent modes of operation in a wireless device to achieve maximum radio efficiency and the greatest possible bandwidth.

Another advantage of the present invention is that the effective data transmission rate may be increased by an amount proportional to the subscriber hardware/software capabilities.

Yet another advantage of the present invention is that it enables network interfacing, i.e., LAN-to-Wide Area Network ("WAN"), WAN-to-LAN, multi-WAN-to-LAN, multi-LAN-to-WAN, multi-LAN-to-multi-WAN and multi-WAN-to-multi-LAN.

Another advantage of the present invention is that provides for more effective communications hardware, such as a universal wireless data modem. Such a device is useful, for example, for secured communications, for robust data communications, and for large-bandwidth, fixed wireless applications.

Still another advantage of the present invention is that it enables high speed wireless internet data communication applications.

BRIEF DESCRIPTION OF THE DRAWINGS

The foregoing aspects and the intended advantages of the present invention will become more readily apparent by reference to the following detailed description, when taken in conjunction with the accompanying drawings, wherein.

DETAILED DESCRIPTION OF THE INVENTION

According to the present invention, a message is split into at least two message fragments and each message fragment is sent simultaneously (or sequentially) via multiple independent transmitting sources in fundamental ways over several radio frequency ("RF") channels, using one or more air interfaces. Although different in fundamental ways, OFDM (Orthogonal Frequency Division Multiple Access) technology is similar to the present invention in that a given message is split and sent over a selected cluster of RF channels. However, the OFDM technology is not as effective as the present invention in increasing bandwidth for data transmission because in OFDM only one transmission source is used, the same modulation and coding scheme is used by all of the selected channels, and a single protocol stack is used by all of the selected channels. Whereas, in the present invention, the message fragments are sent via multiple independent sources. Accordingly, the selected channels use different signaling schemes, and each network utilized is not limited by having to operate using the same protocol stack.

Table 1 below illustrates the key difference between the present invention and the prior art OFDM technology.

|  | OFDM | Invention |
| --- | --- | --- |
| Source of the message | One single source | Multiple independent sources |
| Modulation/coding type | The same modulation/ coding type is used by all the channels | Channels use different (independent) signaling schemes |

| | OFDM | Invention |
|---|---|---|
| Protocol stack | One protocol stack for all channels | Every network may be using a different protocol stack |

Table 1

Figure 1:
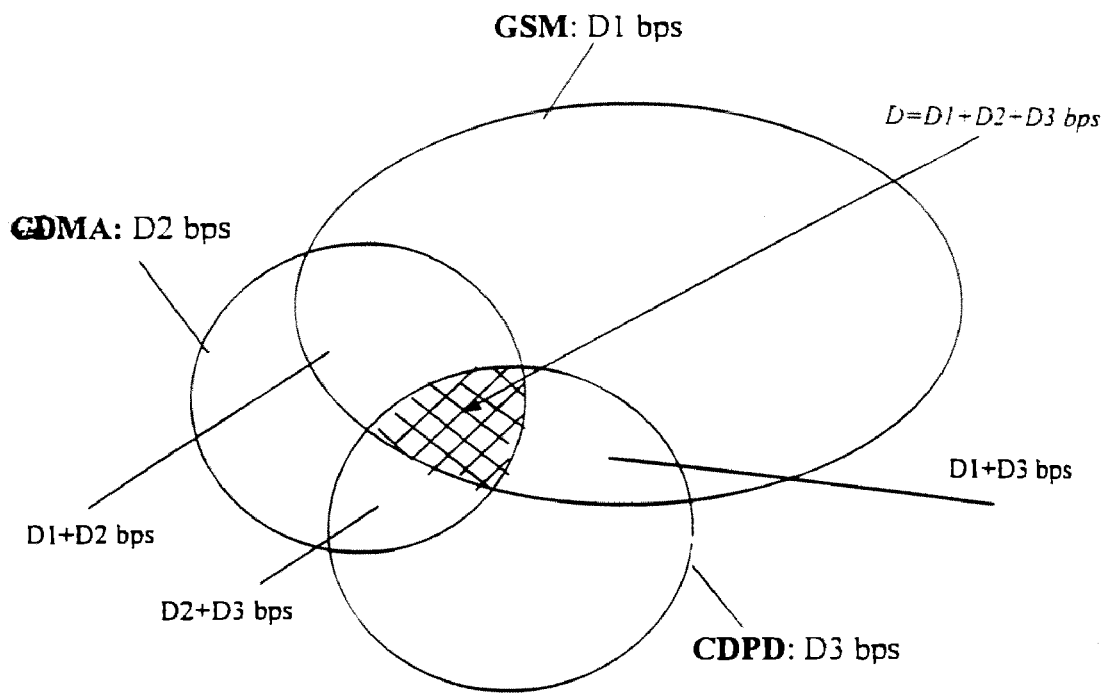
FIG. 1 illustrates an effective throughput/coverage performance in an exemplary cellular region that can be achieved according to the present invention.

FIG. 1 illustrates an effective throughput and coverage performance that can be achieved according to the present invention. Three independent transmitting sources (or "networks") are available in the exemplary cellular region illustrated in FIG. 1: GSM having a data transmission rate or throughput of D1 bits per second ("bps"); CDMA having a throughput of D2 bps; and CDPD having a throughput of D3 bps. FIG. 1 shows that the present invention may be used, for example, to split a message into three message fragments and to send a different message fragment via each network. In such a case, the effective throughput would be the aggregate of the throughput for the individual networks, or D1+D2+D3.

Figure 2:
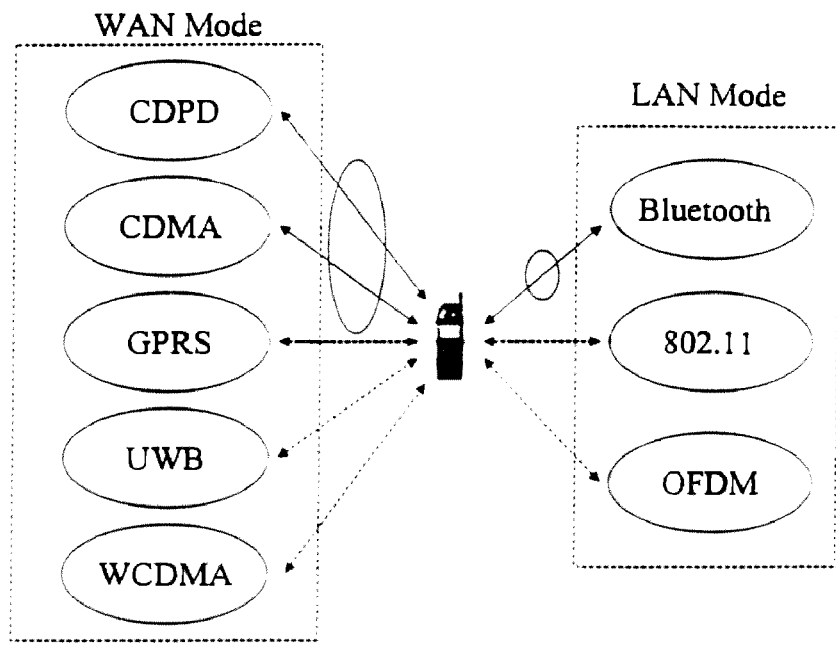
FIG. 2 is a diagram showing a parallel multimode operation of a modem device according to the present invention.

FIG. 2 is a diagram showing a parallel multimode operation of a modem device according to the present invention. This device is constructed to operate in either a LAN or a WAN mode, and supports a plurality of standards in each mode, i.e., CDPD, CDMA, GPRS, UWB, and WCDMA in the WAN mode, and Bluetooth, IEEE 802.11 and OFDM in the LAN mode. The illustrated device according to the present invention is further constructed for simultaneous use of at least two of its compatible standards. For instance, the device might operate simultaneously with CDMA and GSM in order to increase the effective bandwidth of the data throughput to and from the modem device.

Those skilled in the art will realize that other combinations of the available standards may be utilized. Moreover, other conventional standards and even future wireless or wireline standards may be incorporated for use by the modem device to provide a maximum utilization of flexibility and bandwidth.

Figure 3:
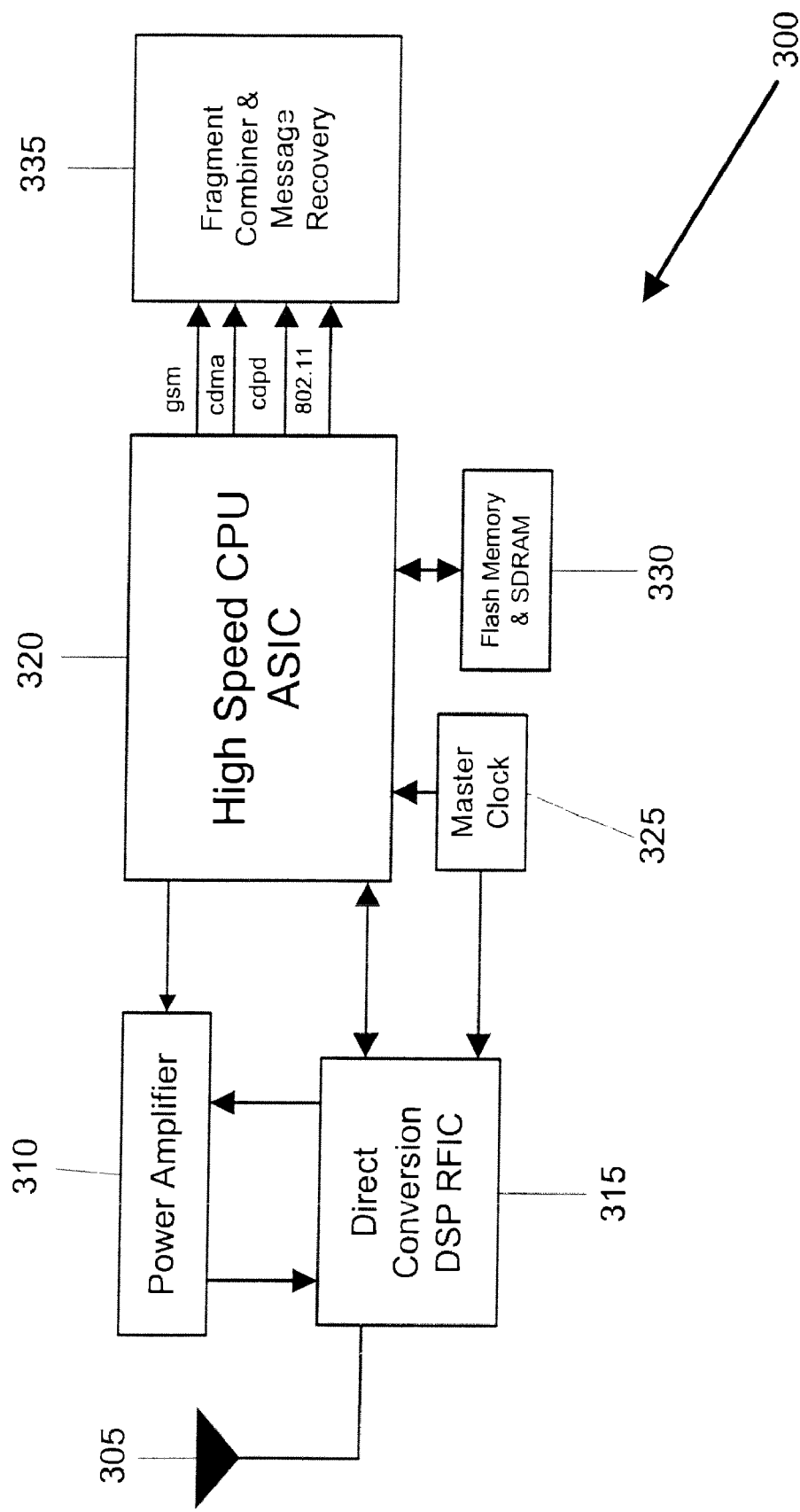
FIG. 3 is a block diagram of a multimode modem architecture according to one embodiment of the present invention.

FIG. 3 is a block diagram of a multimode modem 300 according to one embodiment of the present invention. In this embodiment, RF modem 300 operates in a receive mode to receive electromagnetic signals carrying messages, each message including a stream of data bits. RF modem 300 also operates in a transmit mode to send electromagnetic signals carrying messages, each message including a stream of data bits. Modem 300 is further operative to receive simultaneously or sequentially a message that has been split into at least two message fragments, wherein each message fragment includes an identifier of where that message fragment was located within the message, which enables each message fragment to be transmitted to the RF modem as a separate electromagnetic signal via a separate selected independent communications network using a corresponding radio frequency channel. Modem 300 is also operative to recombine the message fragments into the original message.

Modem 300 comprises an antenna 305, a power amplifier 310, a software configurable direct conversion DSP RFIC 315, a high speed software configurable CPU ASIC 320, a master clock 325, a Flash memory and SDRAM 330, and a fragment combiner and message recovery unit 335. These components of modem 300 are electrically connected as illustrated by the solid lines in FIG. 3 between those components.

Antenna 305, power amplifier 310, clock 325, and memory 330 are conventional components well known on the art. A direct conversion DSP RFIC 315 is an RF front end component that is able to perform RF conversion in the receive mode so as to simultaneously receive at least two message fragments from different transmission sources. DSP RFIC 315 is further operative, for each said separate electromagnetic signal, to receive the signal, to detect the radio frequency over which the signal was transmitted, and to downconvert the signal to generate a corresponding baseband signal. CPU ASIC 320 is preferably a conventional component that functions as a controller or processor for modem 300 and also performs baseband processing and protocol stack control. In the receive mode, CPU ASIC 320 decodes each baseband signal to generate a corresponding message fragment having a stream of data bits and including protocol data bits and then removes the protocol data bits to enable the original message to be recreated. In the transmit mode CPU ASIC 320 adds protocol data bits to a stream of data bits corresponding to a message and encodes the data bits into a baseband signal for processing by DSP RFIC 315. CPU ASIC 320 is further operative to detect the identifier in each message fragment. Fragment combiner 335 is also a conventional component used to recombine the message fragments into the original message as a function of the identifier included with each message fragment. Fragment combiner 335 may be integrated within CPU ASIC 320 or may be a separate component.

Figure 4:
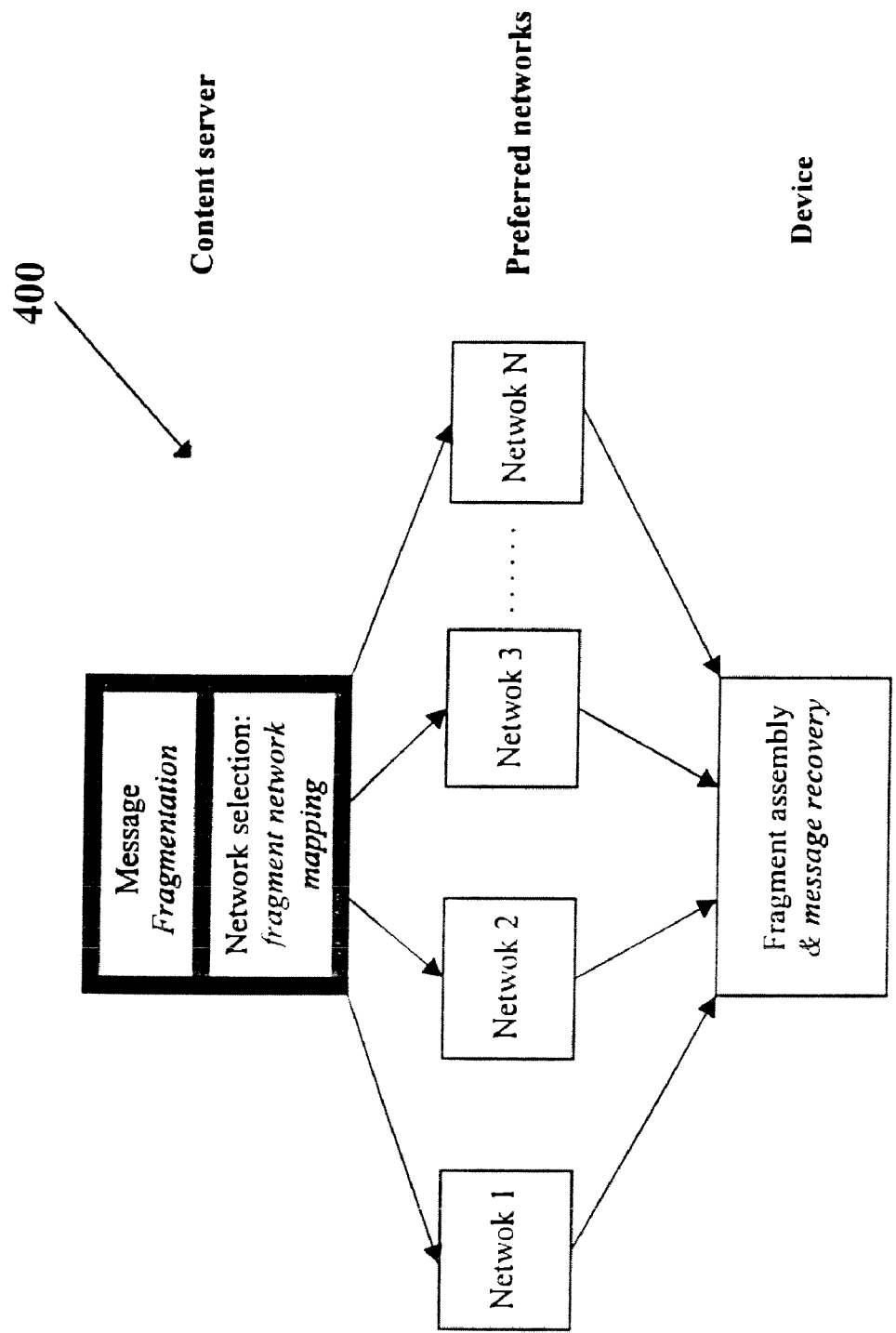
FIG. 4 is a flow chart that describes a message fragmentation and delivery method according to a preferred embodiment of the present invention.

FIG. 4 shows a flow chart that describes a message fragmentation and delivery method 400 according to a preferred embodiment of the present invention. In general, a message to be transmitted to a receiving device is split, preferably by a content server, into at least two message fragments and the message fragments are sent simultaneously via multiple selected transmitting sources (Networks 1 through N which may be preferred networks according to one or more predetermined criterion) over several radio frequency channels, preferably using different air interfaces (a heterogeneous transmission technique). The message fragments could also be sent via multiple transmitting sources using the same air interfaces (a homogeneous transmission technique). The message fragments are then reassembled by a receiving device ("terminal"), preferable a mobile device having a wireless RF modem, to generate the original message.

More specifically, after a message intended to be delivered to a terminal is broken into two or more fragments, the fragments are preferably numbered to facilitate message reassembly at the receiver end. The message fragmentation operation also preferably takes place within an externally located content server. In packed data networks, packet numbering is not required. Transmission Control Protocol/Internet Protocol ("TCP/IP") can be used to perform numbering, but transparently. Each fragment is then carried by a different network.

For example, within a geographic area where both GSM and CDMA networks are deployed, the GSM network may carry the first half of the message while the CDMA network may carry the second half of the message. The receiving device is assumed to have the capability of decoding both halves of the message and of reconstructing the original message. RF radios may be software configurable to more easily achieve this task.

There are many ways of implementing method 400. A specific example is as follows. A large streaming video is to be sent by MPEG4 encoding over a wireless connection. Assume there are two standards available in a region. For the purposes of this example, we will also assume the standards are IS-95B and CDPD, with data rates of 14400 plus 19200 bps, respectively, which are to be combined to obtain an aggregate rate of 33600 bps. The image is broken into two parts, with one standard carrying 14400/33600 or 43% of the data and the second carrying 19200/33600 or 57% of the data to obtain the aggregate transfer rate of 33600 bps. In other words, the streaming video image data is divided proportionally to match the data transfer rate of each of the available channels in order to obtain the desired increased data throughput. In this example, the effective data rate into the receiving device is doubled by simultaneously using the two networks to transmit the message fragments. Generally, the potential for increasing the effective data rate at the receiving device is only limited by the networks available for transmitting data, if the device is constructed with the required software and hardware capabilities.

Figure 5:
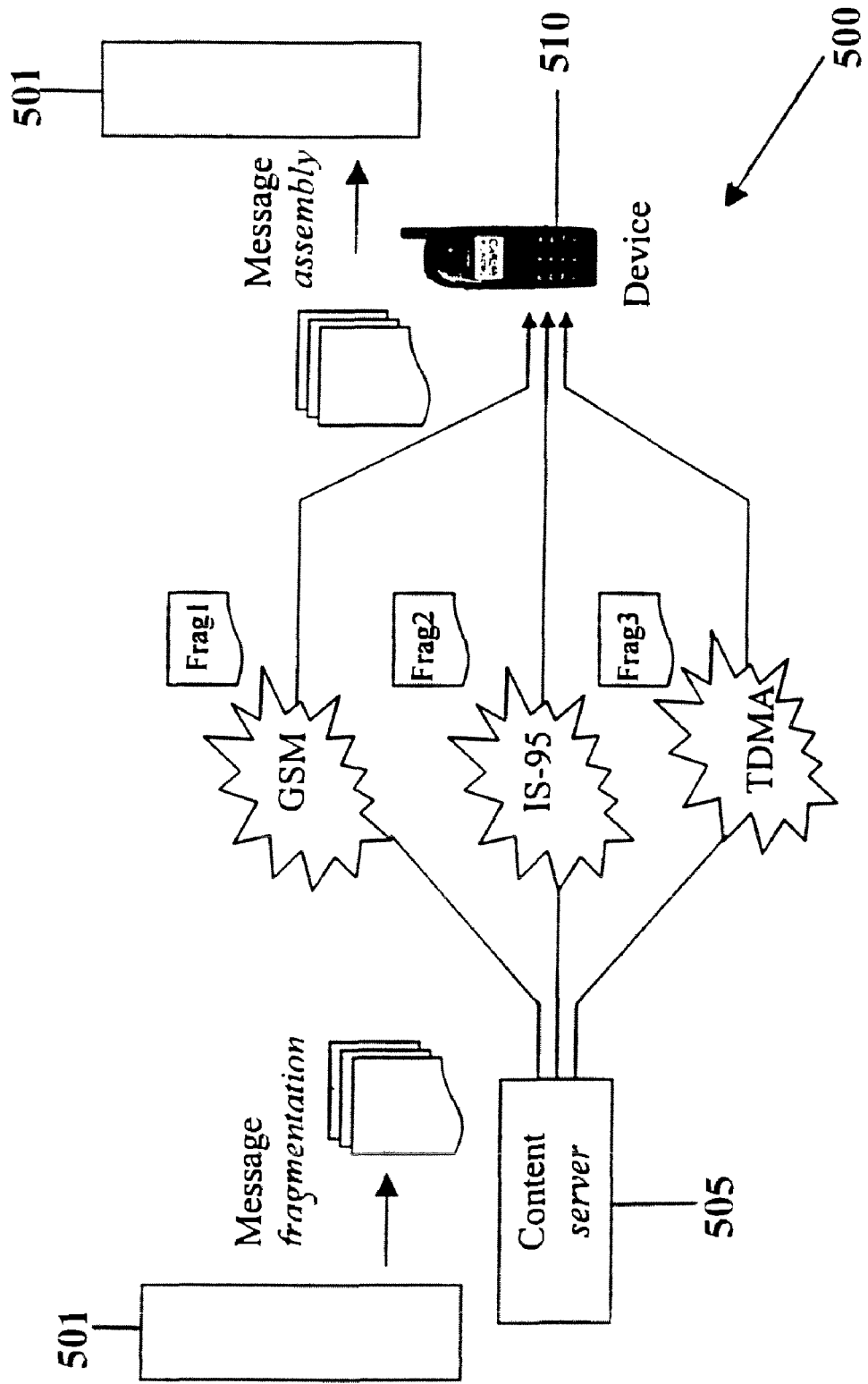
FIG. 5 is a diagram illustrating a method for fragmenting a message to be delivered across three independent networks according to one embodiment of the present invention.
Figure 6:
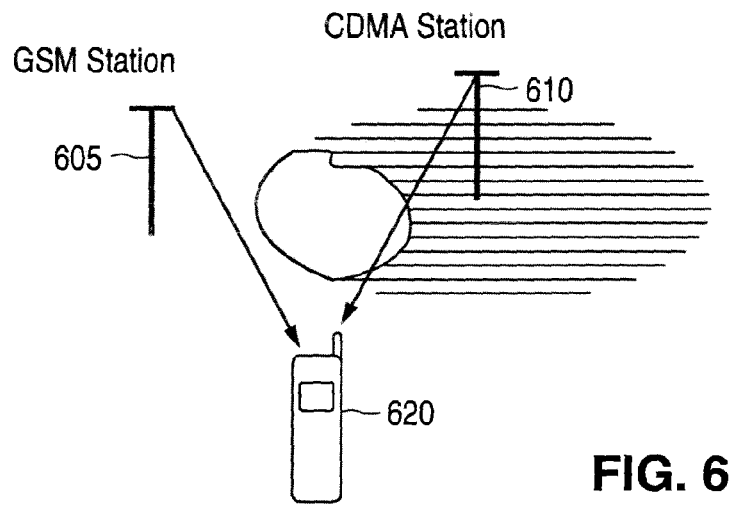
FIG. 6 is a diagram illustrating how a split message is delivered using two independent networks, where they overlap in the coverage area.

FIG. 5 is a diagram illustrating a method 500 for fragmenting a message to be delivered across three networks according to one embodiment of the present invention. In this example, a content server 505 splits a message 501 into three message fragments Frag1, Frag2 and Frag3. Frag1 is transmitted via a GSM network. Frag2 is transmitted via an IS-95 network, and Frag3 is transmitted via an TDMA network. Device 510, illustrated as a mobile telephone, assembles the message fragments to recreate message 501. FIG. 6 is a diagram illustrating a single message being split into two message fragments and the fragments simultaneously delivered via a GSM base station and a CDMA base station, wherein device 620, illustrated as a mobile telephone recombines the message fragments to generate the original message. The GSM base station and the CDMA base station overlap in coverage area.

The operation of message fragmentation is preferably performed either by a mobile device (for uplink transmissions) or by a proxy server (for downlink transmissions). Those skilled in the art will realize that the message fragmentation operation can also take place at a mobile switching center a network controller or at a transmitter controller. For the sake of simplicity, only message fragmentation at the proxy server level is described below.

Figure 7:
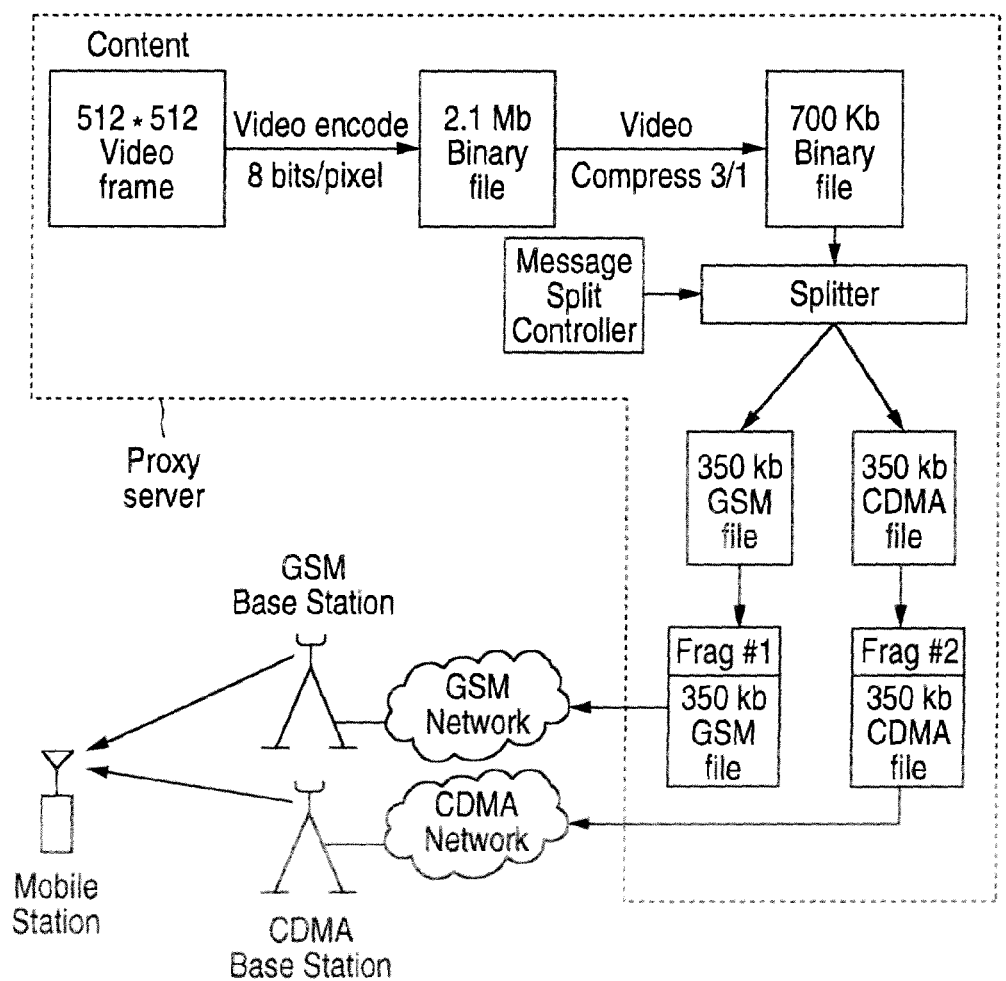
FIG. 7 is a block diagram illustrating the operation of message fragmentation at a proxy server.

FIG. 7 depicts the operation of message fragmentation at a proxy server connected to the Internet, for example, so that the message can be sent to an Internet Protocol address associated with an intended receiving unit. The proxy server includes an Internet communications adapter and a software program executed by the proxy server. A video image is used for illustration purposes. A compressed video image is divided into two fragments. A message split controller is responsible for the message split operation. The size of each fragment is determined depending upon the available bandwidth on each network selected to transmit the message fragments.

Other criterion may be considered during the fragmentation process. For instance, the message may be fragmented into pieces according to a Quality of Service ("QoS") criterion, such as latency, cost, required power, battery life, etc. The role of the message split controller is to orchestrate the operation of message fragmentation according to predefined QoS rules. For example, voice signals (less tolerant to network latency) may be sent on a circuit switch network while data files (more tolerant to latency) can be sent on a packet switch network. Each message fragment may have a QoS indicator attached to it so that the message fragment is sent using a network that satisfies the corresponding QoS requirement.

Message fragmentation can also be done at a packet level. For instance, multiple packets may be interleaved before being transmitted over the different networks, which can be either homogeneous or heterogeneous networks. Interleaving helps equalize the overall system performance in terms of latency, packet error rate, coverage, etc. Packet interleaving introduces diversity into the system.

Figure 8:
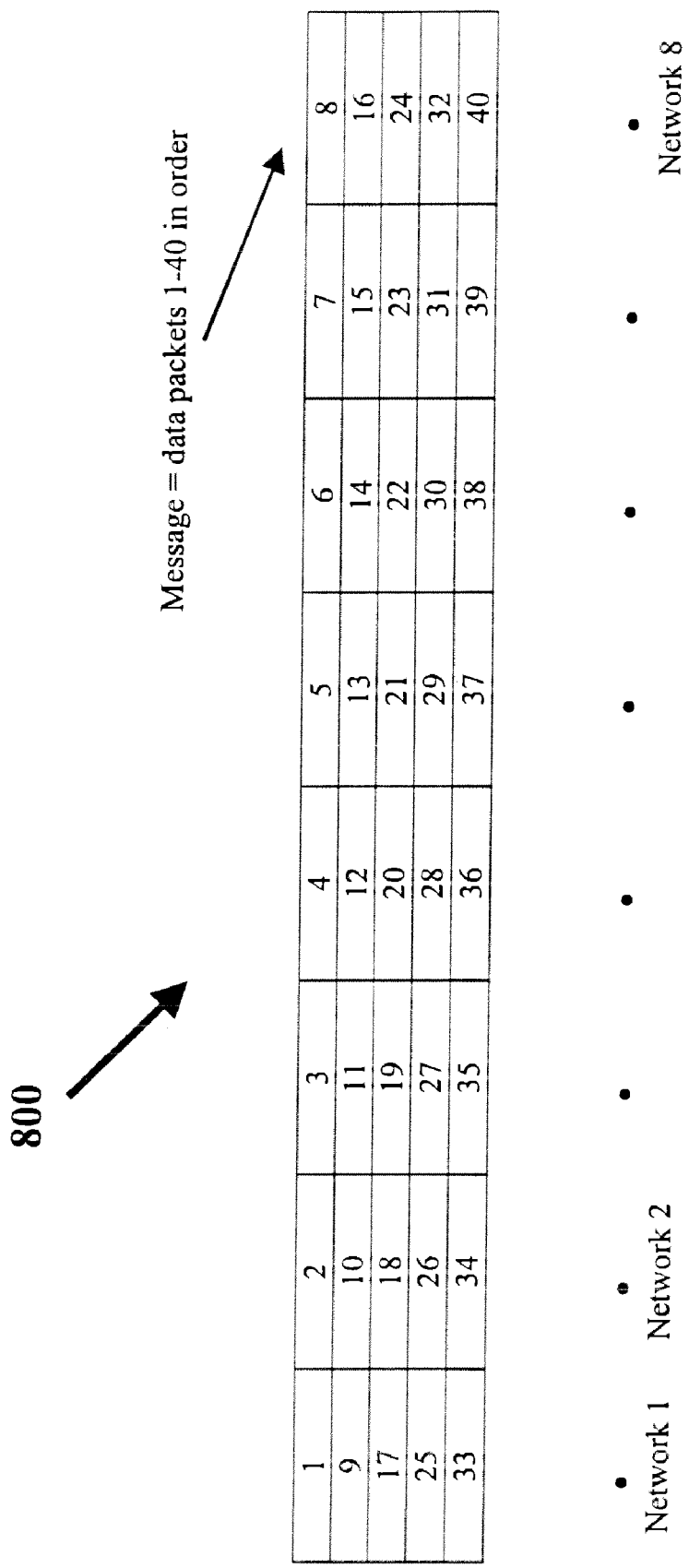
FIG. 8 is an illustration of a method according to the present invention, wherein interleaved and transmitted over multiple networks.

FIG. 8 illustrates an interleaving table 800 that may be used to facilitate data transmission according to the present invention. According to the interleaving table illustrated in FIG. 8, packets 1 through 40 are ordered row wise and transmitted column wise over Networks 1 through N. Each column of packets are sent over a different network. To illustrate the benefits of interleaving according to interleaving table 800, suppose that Network 1 is a low reliability network and that packet 1 was unsuccessfully sent over Network 1. Because of interleaving, packet 1 will be retransmitted on another network other than Network 1, thereby giving packet 1 an increased chance of being successfully received on the second try. Without packet interleaving, packet 1 would have been assigned exclusively to unreliable Network 1 and therefore would take more time than other packets to reach its final destination. This would in turn introduce backlog in Network 1 and resultantly cause the message reconstruction at the receive end to be delayed.

In the FIG. 8 illustration, interleaving is done at the packet level. However, those skilled in the art will realize that interleaving can be done at a fragment level or even at a bit level.

Referring again to FIG. 7, at the receiver end, the message is simply reconstructed by reordering all of the received packets. In addition, the selection of which networks to use may be accomplished in a number of ways. For instance, the receiving unit a monitor a cellular region to detect RF activity relative to multiple channels each supporting different standards. The receiving unit can then report to the proxy server a list of RF channels detected as well as the air interfaces used. The reported information may be used by the proxy server to split a message and transmit the message fragments in accordance with that list. Alternatively, the receiving unit may suggest to the proxy server to perform message fragmentation according to one or more preferred rules.

Moreover, the list of Existing protocols such as TCP/IP can guarantee message fragment ordering without numbering the packets prior to message transmission. In the situation where circuit switch networks are used, packets must be numbered according to any conventional numbering rule prior to transmission, and a mobile device for instance, would reassemble the received packets according to the applicable numbering rule. Finally, when the present invention is used in the uplink, i.e. transmit content from a mobile device to a proxy server, the same steps of the process shown in FIG. 7 take place in the mobile device.

Figure 9:
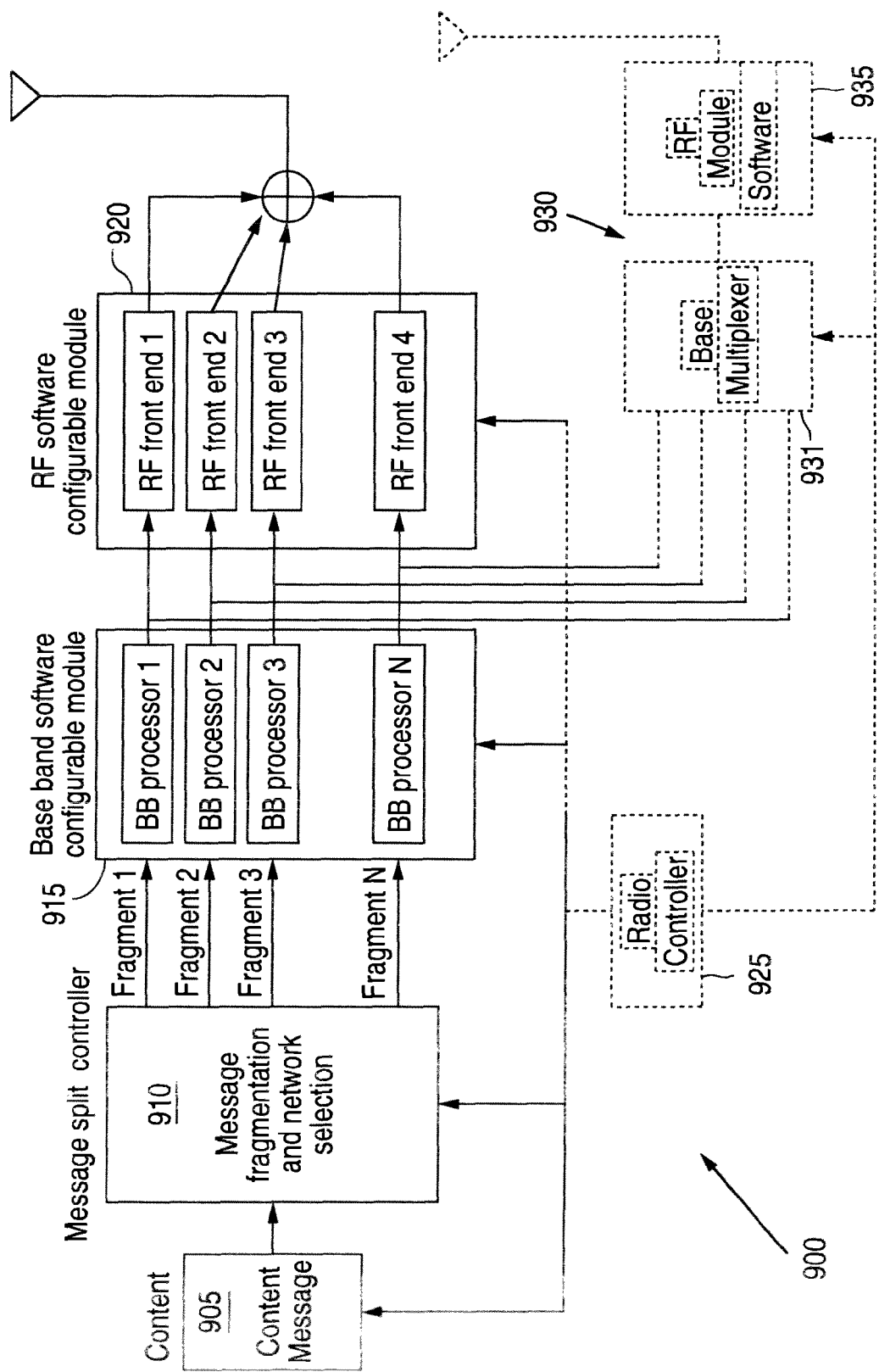
FIG. 9 is a block diagram of a preferred embodiment of an RF modem architecture according to the present invention.

FIG. 9 is a block diagram illustrating an RF modem 900, that can be included in a mobile device, capable of message fragmentation according to a preferred embodiment of the present invention. Modem 900 comprises all of the components as illustrated in modem 300 of FIG. 3. Specifically, modem 900 includes a suitable power amplifier device, an RFIC device capable of producing the appropriate baseband signals, and a CPU/ASIC device with suitable memory capable of recovering binary data from the baseband signals received from the conversion RFIC device and a fragment combiner and message recovery device Modem 900 further comprises a message split controller 910 coupled to the CPU/ASIC and used to fragment a message, intended for transmission, according to a predefined rule. Preferably, the rule of message fragmentation and network selection is based on a QoS criterion. These components work together to achieve the desired multi-mode packet transfers and aggregation over multiple standards and air interfaces.

The message fragments 1 through N of Message content 905 are generated by message split controller 910 and passed to base band processor 915, which is preferably software configurable. Baseband processor 915 is preferably a plurality of baseband processors 1 through N connected in parallel to simultaneously process each received message fragment. Each fragment is processed according to selected physical layer specifications. After baseband processing, the data is passed to an RF front end for up-conversion and transmission. The RF front end for FIG. 9 can be implemented in two preferable ways. A conventional implementation 920 is based on multiple RF front ends connected in parallel. Each RF front end is used to up-convert a single base band signal. An alternative RF front end 930 uses a base band multiplexer 931, which is preferably software programmable. The mixed signal is then up-converted using a single software configurable RF circuit 935.

Figure 10:
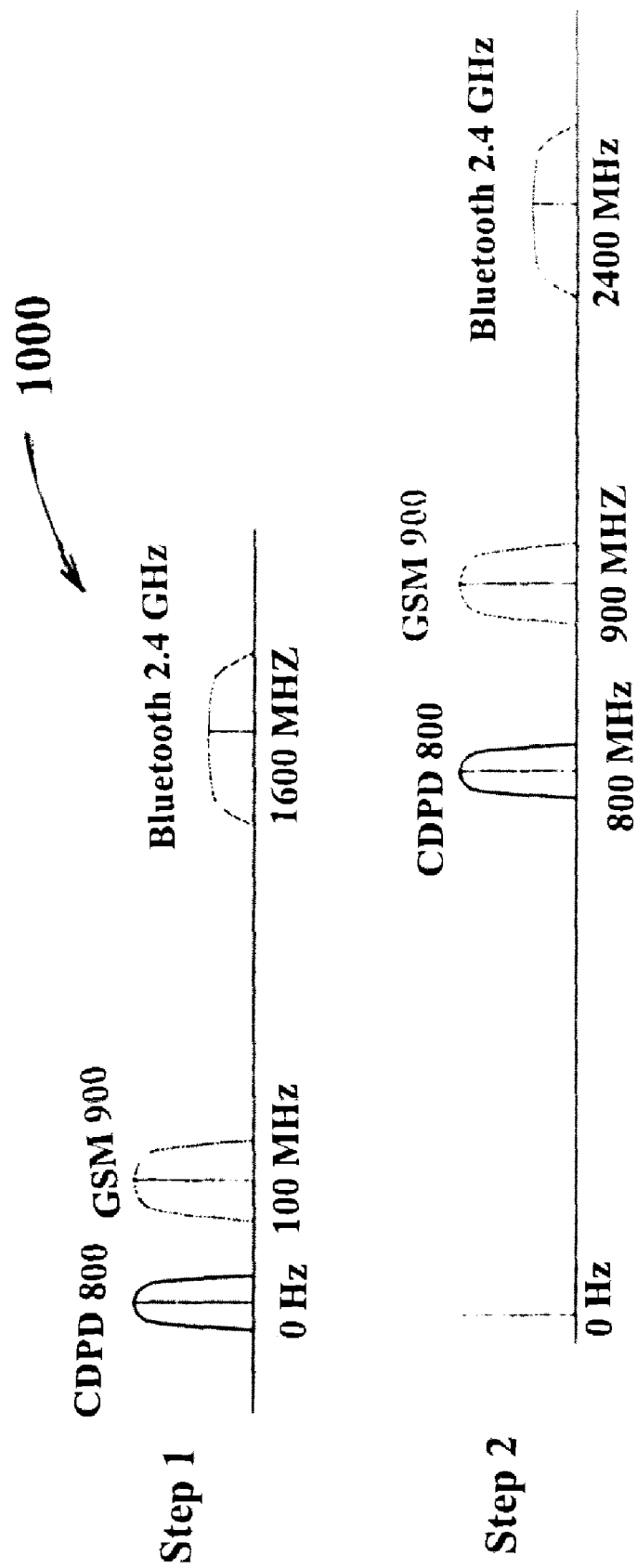
FIG. 10 illustrates an upconversion methodology when RF front end 930 of FIG. 9 is implemented.

FIG. 10 illustrates an upconversion methodology 1000 used when RF front end 930 of FIG. 9 is implanted. Step 1 consists of mixing base band signals into a single baseband signal, in this example for simultaneous transmission over a CDPD network at 800 Mhz, a GSM network at 900 Mhz, and a Bluetooth network at 2.4 GHz. The resulting signal will have an effective bandwidth equal to the frequency separation between the highest and lowest frequency signals. Step 2 of the process consists of up-converting the resulting base band signal to the required frequency.

Methodology 1000 has the unique advantage of being completely transparent to a carrier as shown by the following illustration. Assume that an aggregator for providing communications services purchases a certain amount of bandwidth from a number of carriers. Each of these carriers may be using a different technology. For instance the aggregator may have a contract with Sprint PCS (using CDMA technology) to use 100,000 wireless phone lines and another contract with AT&T (TDMA) for using another 100,000 wireless phone lines for the purpose of reselling the SPRINT and AT&T services to its customers at a lower cost with higher throughput. Now assume a customer is equipped with a wireless device that can simultaneously decode TDMA and CDMA signals, and the customer wants to download a 1 Mbyte video file to his cell phone. The following steps should take place:

1. The cell phone sends a request to the aggregator's proxy server requesting the download of a file and at same time informs the proxy that its is within coverage of both SPRINT and AT&T networks. Informing the proxy about the list of networks within coverage is optional. The proxy may already know by other means;
2. The aggregator's proxy splits the message into two portions, preferably proportional to the amount of bandwidth available on the subject networks. Each portion of the message is sent simultaneously to the cell phone using a different network, e.g. portion one via AT&T and portion two via SPRINT); and
3. The cell phone reassembles the two received data portions according to a protocol defined between the proxy and the cell phone.

Figure 11:
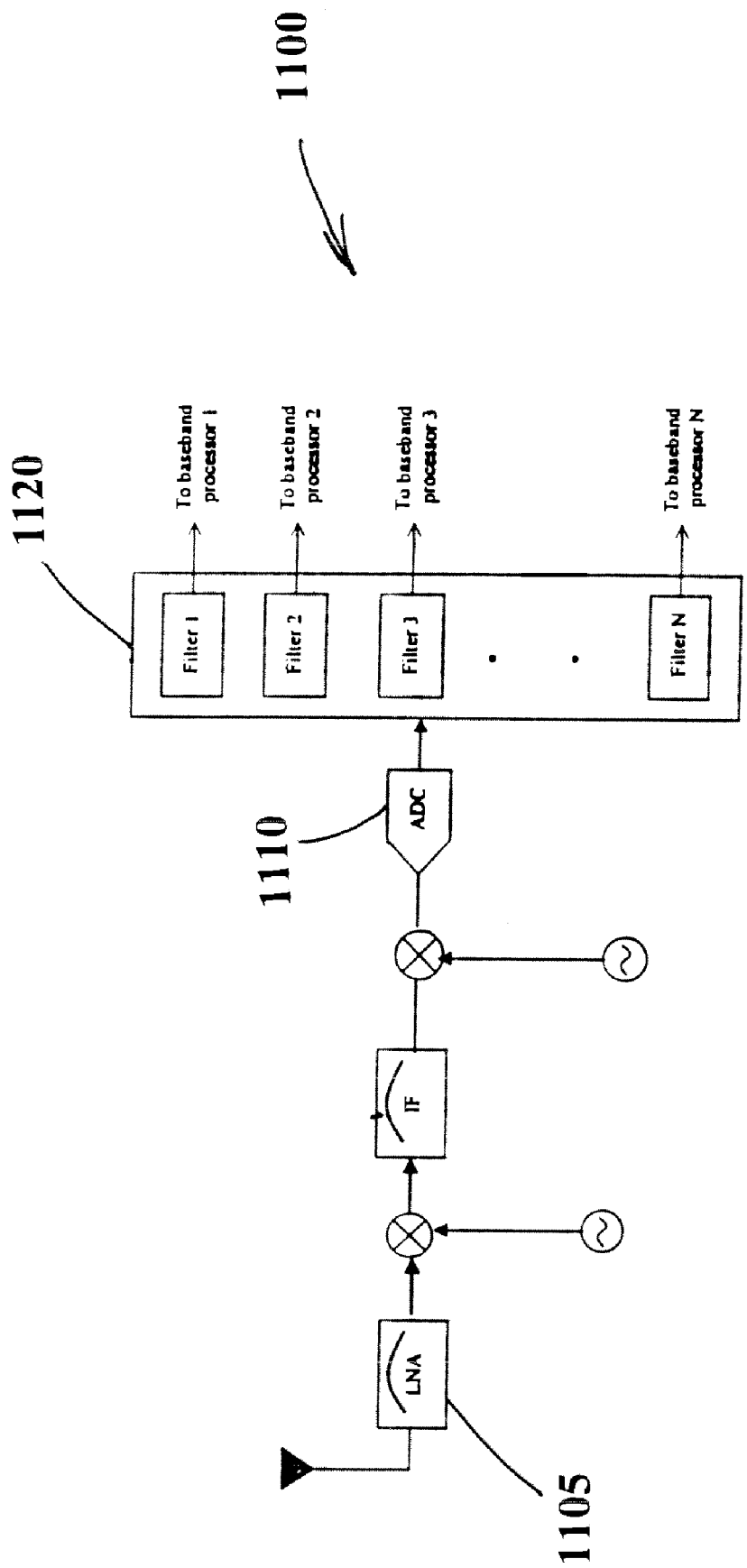
FIG. 11 is a block diagram illustrating a RF front end receiver architecture according to a preferred embodiment of the present invention.

FIG. 11 is a block diagram illustrates a RF front end receiver architecture 1100 according to a preferred embodiment of the present invention. RF front end architecture 1100 is suitable for the special case when a device is used to send a fragmented message over multiple identical networks (e.g., all GSM networks or all CDPD networks, etc.). However, architecture 1100 is preferably constructed for use with a hybrid combination of networks. Architecture 1100 comprises a low noise amplifier ("LNA") 1105, a high rate analog to digital converter ("ADC") 1110 and a bank of digital 1120 comprising Filters 1 through N connected in parallel. The components are electrically connected as illustrated in FIG. 11 by the lines between those components.

Architecture 1100 functions as follows. Upon passing through LNA 1105 and wherein an intermediate frequency ("IF") is generated, a large spectrum bandwidth (e.g., several MHz) is down-converted to baseband and sampled using ADC 1110. The rate of ADC 1110 is preferably at least twice the size of the down-converted frequency band. digital filter bank 1120 is used to tune to the receive frequency of each of the subject networks. Note that the digital filters are identical if the receiver is performing parallel detection of homogeneous transmitted signals. Homogenous transmitted signals are signals which have a format defined according to the same air interface as opposed to heterogeneous transmitted signals which are signals transmitted according to different air interfaces. The output of digital filter bank 1120 represents multiple baseband signals each representing a specific data network. The baseband signals are passed to a single (or multiple) baseband processors to retrieve the message fragments in a way similar to what is disclosed in connection with FIG. 4.

The embodiments of the method and apparatus for distributed data transfer over multiple independent wireless networks described above are illustrative of the principles of the present invention and are not limited to the particular embodiments described. Other embodiments of the present invention can be adapted for use in any RF wireless environment. Accordingly, while the preferred embodiment of the invention has been illustrated and described, it will be appreciated that various changes can be made therein without departing from the spirit and scope of the invention.

What is claimed is:

1. A method for transmitting a message to a single receiving unit over a plurality of independent transmitting sources, the method comprising:
   selecting at least two available transmitting sources for transmitting message fragments of the message to the receiving unit;
   splitting the message into a plurality of said message fragments according to at least one predetermined criteria;
   transmitting each of the message fragments to the receiving unit via a separate one of the selected transmitting sources;
   receiving each transmitted signal at the receiving unit and extracting the corresponding message fragment from the received signal; and
   combining the message fragments to reconstruct the message.

2. The method of claim 1, wherein at least one of the message fragments includes a data file.

3. The method of claim 1, wherein at least one of the message fragments include voice signals.

4. A method for transmitting a message to a single receiving unit over a plurality of independent transmitting sources, the method comprising:
   selecting at least two available transmitting sources for transmitting message fragments of the message to the receiving unit;
   splitting the message into a plurality of said message fragments according to at least one predetermined criteria;
   transmitting each of the message fragments to the receiving unit via a separate one of the selected transmitting sources,
   wherein each transmitted signal is configured to be received at a receiving unit, and wherein the message fragments are configured to be recombined at the receiving unit to reconstruct the message.

5. The method of claim 4, wherein at least one of the message fragments includes a data file.

6. The method of claim 4, wherein at least one of the message fragments include voice signals.

7. A method for receiving a message over a plurality of independent transmitting sources, the method comprising:
   receiving a plurality of message fragments corresponding to the message over a plurality of transmitting sources; and
   combining the message fragments to reconstruct the message.

8. The method of claim 7, wherein at least one of the message fragments includes a data file.

9. The method of claim 7, wherein at least one of the message fragments include voice signals.

10. The method of claim 1, wherein each of the message fragments includes an identifier of where the message fragment was located in the message and wherein the message fragments are combined as a function of the identifiers.

11. The method of claim 1, wherein each of the message fragments is a file.

12. The method of claim 1, wherein at least one of the message fragments includes either a video stream or a voice stream.

13. The method of claim 4, wherein each of the message fragments includes an identifier of where the message fragment was located in the message and wherein the message fragments are combined as a function of the identifiers.

14. The method of claim 4, wherein each of the message fragments is a file.

15. The method of claim 4, wherein at least one of the message fragments includes a video stream.

16. The method of claim 4, wherein at least one of the message fragments includes a voice stream.

17. The method of claim 7, wherein each of the message fragments includes an identifier of where the message fragment was located in the message and wherein the message fragments are combined as a function of the identifiers.

18. The method of claim 7, wherein each of the message fragments is a file.

19. The method of claim 7, wherein at least one of the message fragments includes a video stream.

20. The method of claim 7, wherein at least one of the message fragments includes a voice stream.

* * * * *